(12) United States Patent
Lee et al.

(10) Patent No.: US 11,470,872 B2
(45) Date of Patent: Oct. 18, 2022

(54) ROBOT

(71) Applicant: LG ELECTRONICS INC., Seoul (KR)

(72) Inventors: Jun Lee, Seoul (KR); Nakyeong Kim, Seoul (KR); Sungmin Moon, Seoul (KR); Sanghak Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 456 days.

(21) Appl. No.: 16/582,543

(22) Filed: Sep. 25, 2019

(65) Prior Publication Data

US 2020/0015508 A1 Jan. 16, 2020

(30) Foreign Application Priority Data

Aug. 28, 2019 (KR) .................. 10-2019-0106053

(51) Int. Cl.
| | |
|---|---|
| *A23P 30/10* | (2016.01) |
| *B67D 3/00* | (2006.01) |
| *F16K 31/06* | (2006.01) |
| *B25J 11/00* | (2006.01) |

(52) U.S. Cl.
CPC .......... *A23P 30/10* (2016.08); *B25J 11/0045* (2013.01); *B67D 3/0058* (2013.01); *F16K 31/06* (2013.01)

(58) Field of Classification Search
CPC ...... A23P 30/10; B25J 11/0045; B25J 9/0018; B25J 9/0087; B25J 9/0009; B25J 9/101; B25J 9/126; B67D 3/0058; F16K 31/06; A47J 44/00

See application file for complete search history.

(56) References Cited

U.S. PATENT DOCUMENTS

| | | | | |
|---|---|---|---|---|
| 3,809,438 A | * | 5/1974 | Hubbard | ............... B65G 53/60 406/106 |
| 5,110,008 A | * | 5/1992 | Moulding, Jr. | ..... G07F 17/0092 221/268 |
| 2006/0147575 A1 | * | 7/2006 | Huszcz | .................... A21C 7/04 425/510 |
| 2016/0067866 A1 | * | 3/2016 | Sekar | ...................... A47J 44/00 99/348 |
| 2017/0354294 A1 | * | 12/2017 | Shivaiah | ............... A47J 36/321 |
| 2020/0009737 A1 | * | 1/2020 | Kim | ......................... B25J 11/00 |
| 2020/0016762 A1 | * | 1/2020 | Kim | ......................... A47J 44/00 |

(Continued)

FOREIGN PATENT DOCUMENTS

| | | |
|---|---|---|
| JP | 4531832 B2 | 8/2010 |
| WO | WO-2016063773 A1 * 4/2016 | ............. B65B 37/08 |

OTHER PUBLICATIONS

Translation of WO-2016063773-A1 (Year: 2016).*

*Primary Examiner* — Leith S Shafi
(74) *Attorney, Agent, or Firm* — Birch, Stewart, Kolasch & Birch, LLP

(57) ABSTRACT

A robot includes an ingredient mold configured to process food ingredients into solid ingredients; a storage container configured to store the solid ingredients processed in the ingredient mold; a transfer tube through which the solid ingredients in the storage container pass; a feed tube connected to the transfer tube, formed with an ingredient port, and having a passage configured to guide ingredients to the ingredient port; and a feeder configured to feed the solid ingredients, which are moved to the feed tube, to the ingredient port.

17 Claims, 10 Drawing Sheets

(56) References Cited

U.S. PATENT DOCUMENTS

| 2020/0016763 A1* | 1/2020 | Lee | B25J 11/0045 |
| 2020/0037824 A1* | 2/2020 | Moon | A47J 36/321 |
| 2020/0039089 A1* | 2/2020 | Lee | B25J 15/0009 |
| 2020/0359845 A1* | 11/2020 | Carlos | A47J 36/321 |

* cited by examiner

ROBOT

CROSS-REFERENCE TO RELATED APPLICATIONS

This application claims the benefit of priority to Korean Patent Application No. 10-2019-0106053, filed in the Korean Intellectual Property Office on Aug. 28, 2019, the entire contents of which are incorporated herein by reference.

FIELD OF THE DISCLOSURE

The present disclosure relates to a robot system and a control method of the same.

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

Recently, a cooking robot capable of cooking by using a robot is gradually increased and an example of such a robot is a cooking assistant robot disclosed in Japanese Patent Publication No. 4531832 (published on Aug. 25, 2010).

The cooking assistant robot disclosed in Japanese Patent Publication No. 4531832 is a robot that assists cooking using a cooking container disposed on a cooking burner, and includes a hand part, an arm part for changing the position and posture of the hand part, and a support part for supporting the arm part as well as at least six movable parts capable of arbitrarily changing the position and posture of the hand part.

SUMMARY

Embodiments provide a robot capable of transporting a solid ingredient high reliability after processing a food ingredient into the solid ingredient.

In one embodiment, a robot includes: a processing module configured to process food ingredients into solid ingredients; a storage container configured to store the solid ingredients processed in the processing module; a transfer tube through which the solid ingredients in the storage container pass; a feed tube connected to the transfer tube, formed with an ingredient port, and having a passage configured to guide ingredients to the ingredient port; and a feeder configured to feed the solid ingredients, which are moved to the feed tube, to the ingredient port.

The robot may further include a control valve disposed at an outlet of the storage container or an upper portion of the transfer tube to control a drop of the solid ingredients contained in the storage container.

The control valve may include: a valve body rotatably disposed at the outlet of the storage container or in the transfer tube; and a motor configured to rotate the valve body.

The motor may include: a motor rod connected to the valve body to linearly move; and a solenoid motor configured to linearly reciprocate the motor rod.

The control valve may be configured to be opened or closed for a time during which a plurality of solid ingredients contained in the storage container drop one by one.

The robot may further include a controller which is configured to: count a number of operation times of the control valve; and stop an operation of the control valve when the number of operation times is equal to or more than a preset number of operation times.

The robot may further include an intermediate valve disposed below the transfer tube. The intermediate valve may include an elastic plug configured to open a transfer passage inside the transfer tube while being deformed by the solid ingredients dropped from the storage container.

The feed tube may be inclined in a direction gradually lowered toward the ingredient port.

A plurality of storage containers, a plurality of control valves and a plurality of transfer tubes may be provided. Each of the plurality of transfer tubes may include a connection terminal connected to the feed tube. The connection terminals of the plurality of transfer tubes may be spaced apart from each other in a longitudinal direction of the feed tube.

The plurality of storage containers may be disposed in parallel to each other. The plurality of transfer tubes may have lengths which are increased as the transfer tubes are located closer to the ingredient port.

The feeder may include a blower disposed opposite to the ingredient port to provide pneumatic pressure to the passage.

The robot may include a variable stopper. The variable stopper may be disposed at the passage to prevent the solid ingredients from moving to the ingredient port when an operation of the feeder is stopped, and to allow the solid ingredients to move to the ingredient port when the feeder operates.

The robot may include a stopper rotatably disposed in the passage; and a spring configured to elastically support the stopper to allow the stopper to rotate in a direction of blocking the passage. The feeder may include a blower configured to blow air having a preset pressure or above to the stopper.

The preset pressure is a pressure that causes the stopper to rotate in a direction of opening the passage.

The robot may further include a limiter disposed in the passage and latched when the stopper is in a direction of blocking the passage.

The robot may further include a robot arm configured to receive the solid ingredients supplied from the ingredient port and formed with an ingredient channel to guide the supplied solid ingredients.

DETAILED DESCRIPTION OF THE EMBODIMENTS

Hereinafter, preferred embodiments of the present invention will be described in detail with reference to the drawings.

Figure 1:
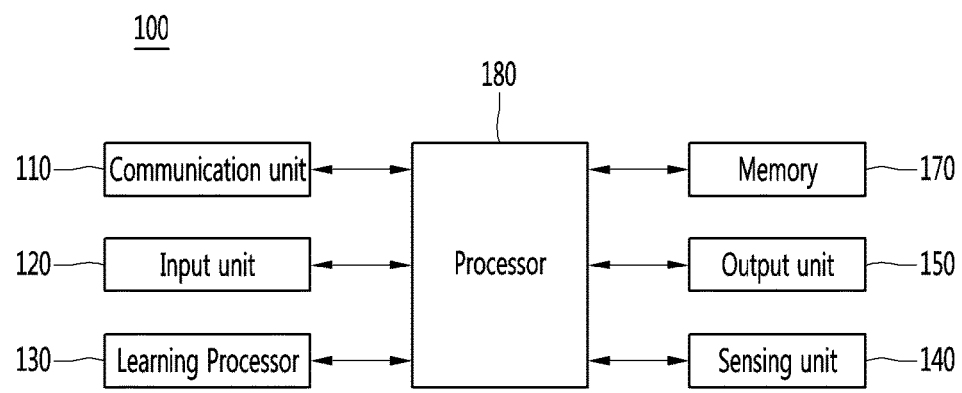
FIG. 1 is a view illustrating an AI device constituting a robot system according to an embodiment.
Figure 2:
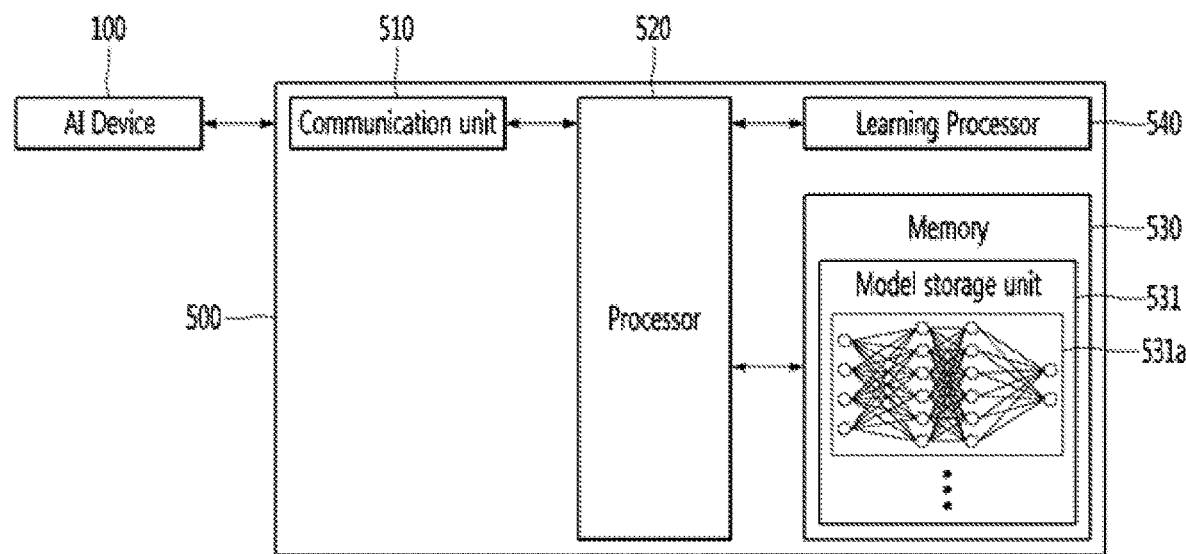
FIG. 2 is a view illustrating an AI server of a robot system according to an embodiment.
Figure 3:
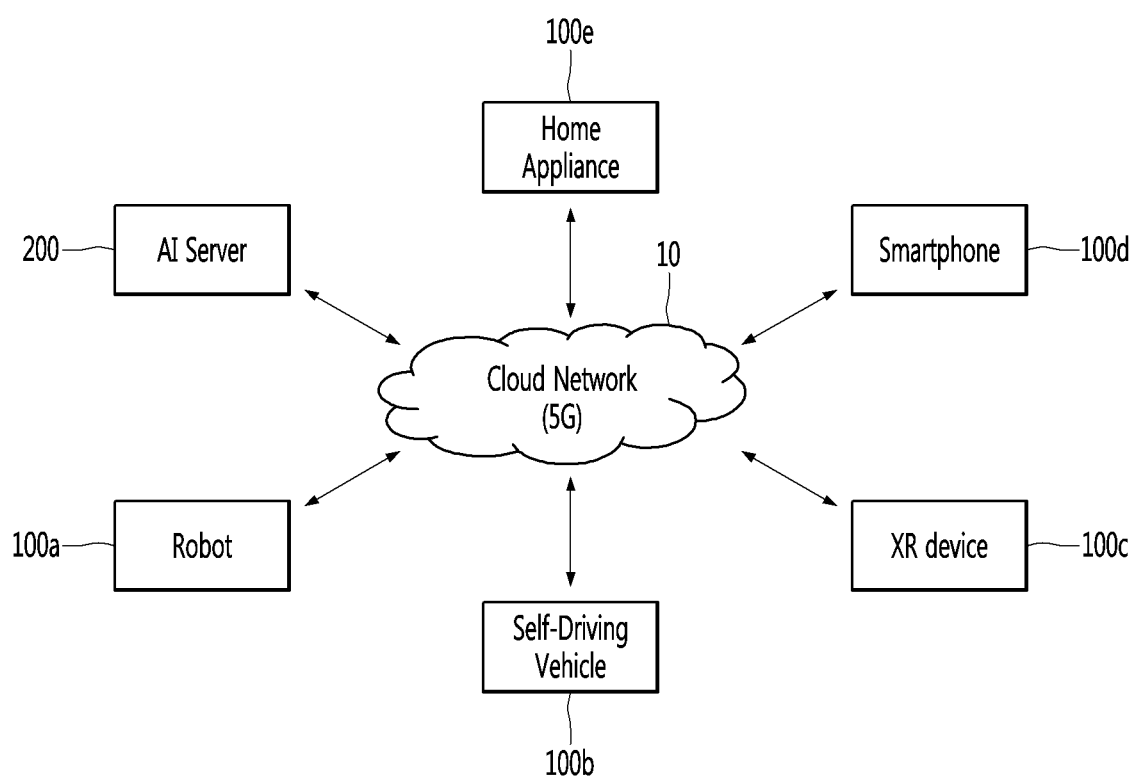
FIG. 3 is a view illustrating an AI system to which a robot system according to an embodiment is applied.

FIG. 1 is a view illustrating an AI device constituting a robot system according to an embodiment, FIG. 2 is a view illustrating an AI server of a robot system according to an embodiment and FIG. 3 is a view illustrating an AI system to which a robot system according to an embodiment is applied.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 500 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 540 of the AI server 500.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 540 of the AI server 500, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 500. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server 500 connected to a robot according to an embodiment of the present invention.

Referring to FIG. 2, the AI server 500 may refer to a device that learns an artificial neural network by using a machine learning algorithm or uses a learned artificial neural network. The AI server 500 may include a plurality of servers to perform distributed processing, or may be defined as a 5G network. At this time, the AI server 500 may be included as a partial configuration of the AI device 100, and may perform at least part of the AI processing together.

The AI server 500 may include a communication unit 510, a memory 530, a learning processor 540, a processor 560, and the like.

The communication unit 510 can transmit and receive data to and from an external device such as the AI device 100.

The memory 530 may include a model storage unit 531. The model storage unit 531 may store a learning or learned model (or an artificial neural network 531*a*) through the learning processor 540.

The learning processor 540 may learn the artificial neural network 531*a* by using the learning data. The learning model may be used in a state of being mounted on the AI server 500 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 530.

The processor 560 may infer the result value for new input data by using the learning model and may generate a response or a control command based on the inferred result value.

FIG. 3 illustrates an AI system 1 according to an embodiment of the present invention.

Referring to FIG. 3, in the AI system 1, at least one of an AI server 500, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 500 configuring the AI system 1 may be connected to each other through the cloud network 10. In particular, each of the devices 100*a* to 100e and 500 may communicate with each other through a base station, but may directly communicate with each other without using a base station.

The AI server 500 may include a server that performs AI processing and a server that performs operations on big data.

The AI server 500 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 500 may learn the artificial neural network according to the machine learning algorithm instead of the AI devices 100a to 100e, and may directly store the learning model or transmit the learning model to the AI devices 100a to 100e.

At this time, the AI server 500 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 500.

At this time, the robot 100a may perform the operation by generating the result by directly using the learning model, but the sensor information may be transmitted to the external device such as the AI server 500 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

Figure 4:
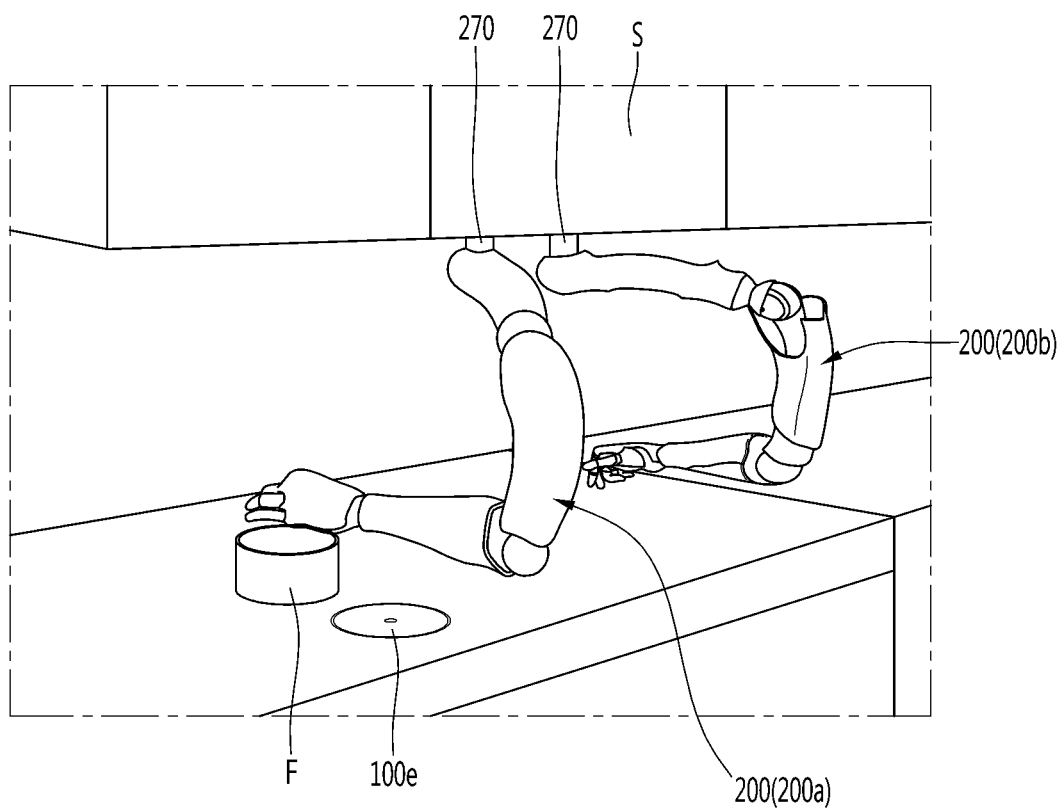
FIG. 4 is a perspective view of a robot according to an embodiment.
Figure 5:
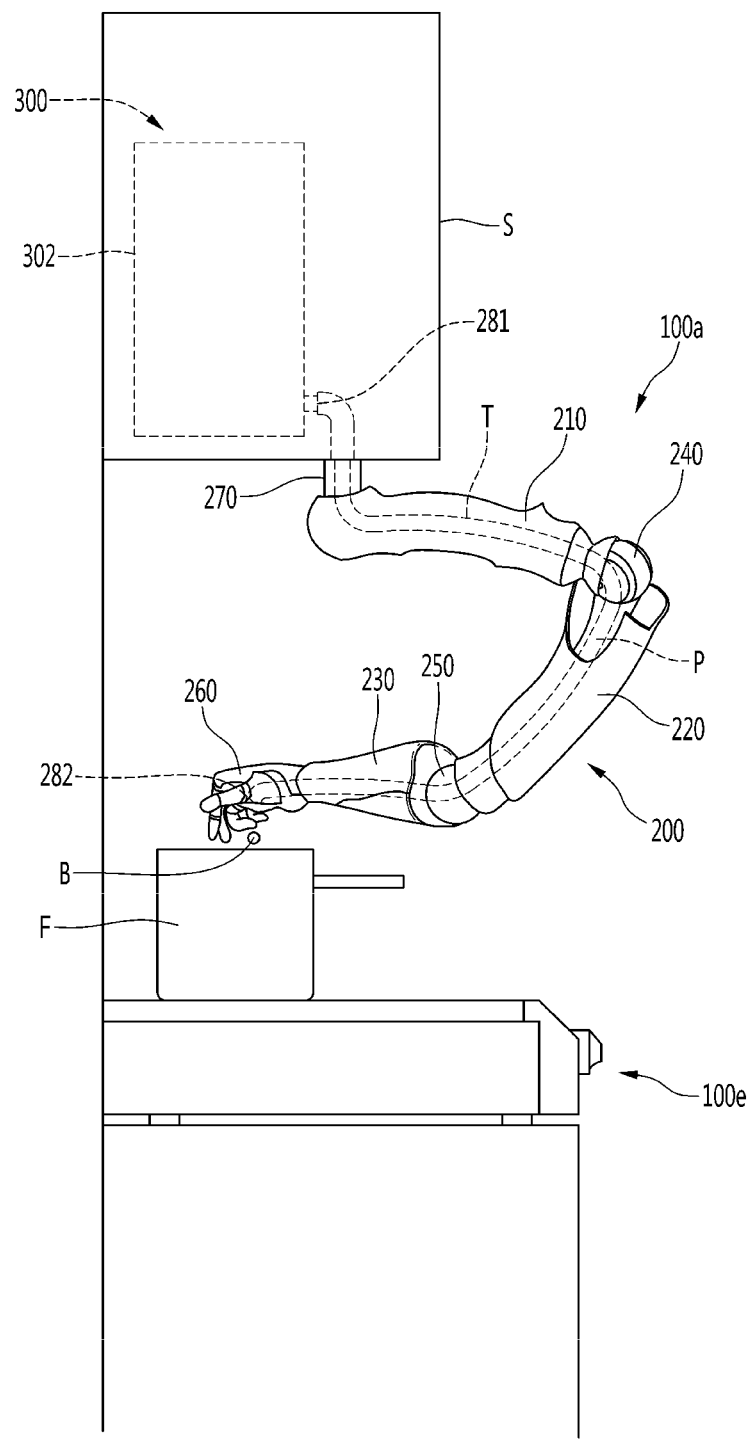
FIG. 5 is a side view illustrating an example of a robot according to an embodiment.

FIG. 4 is a perspective view of a robot according to an embodiment and FIG. 5 is a side view illustrating an example of the robot according to an embodiment.

The robot may include at least one robot arm 200 and an ingredient feeder 300 for processing food ingredients.

The robot arm 200 may perform various cooking operations including an ingredient input operation in a state of being disposed in a kitchen or the like.

The ingredient feeder 300 may process an ingredient used for cooking into a shape or size suitable for cooking.

For cooking, the robot arm 200 picks up the ingredient processed by the ingredient feeder 300 and then puts the ingredient into a tableware or a cooking container F (hereinafter referred to as cooking container F), that is, the robot arm 200 may perform the ingredient input operation.

For cooking, the ingredient feeder 300 may move the food ingredient to the robot arm 200 after processing the food ingredient, and the ingredient moved from the ingredient feeder 300 to the robot arm 200 may be introduced into the cooking container (F) by passing through the robot arm 200.

For the ingredient that passes through the robot arm 200, the robot arm 200 may be provided with an ingredient channel P through which the ingredient passes. That is, the robot arm 200 may receive the ingredient from the ingredient feeder 300, and the ingredient supplied from the ingredient feeder 300 may come out of the ingredient channel P by passing through the ingredient channel P and then fall into the container (F).

The robot arm 200 may be operated at the input timing of the ingredient such that an ingredient outlet 282 of the ingredient channel P faces the inside of the cooking container F.

When the robot arm 200 guides the ingredient supplied from the ingredient feeder 300 to the cooking container F, the ingredient may be introduced into the cooking container F more cleanly, and it is possible to minimize the falling of the ingredient around the cooking container F. That is, when the ingredient channel P through which the ingredient passes is formed in the robot arm 200, the ingredient, in particular, the ingredient processed in the ingredient feeder 300 may be accurately introduced into the cooking container P, so that the surroundings of the cooking container F may be kept to be clean.

The ingredient channel P may be a passage through which the ingredient passes, and the ingredient enters the ingredient channel P through one side of the ingredient channel P, and comes out of the ingredient channel P through the other side of the ingredient channel P.

An end effector 260 may be connected to arms 210, 220 and 230 of the robot arm 200 for various cooking operations.

In addition, the ingredient channel P may be provided inside the arms 210, 220 and 230 and the end effector 260.

The robot arm 200 may perform various cooking operations related to cooking, in addition to the ingredient input operation as described above.

An example of various cooking operations performed by the robot arm 200 is that the robot arm 200 operates a cooking device 100e around the cooking device 100e, stirs the food contained in the cooking container F or transfers the finished cooking from the cooking container F to another containers such as dishes.

The robot arm 200 may include a plurality of arms 210, 220 and 230 and at least one arm connector 240 and 250 connecting the plurality of arms to perform the various cooking operations as described above. The plurality of arms 210, 220, and 230 may be sequentially disposed with the arm connectors 240 and 250 interposed therebetween.

The robot arm 200 may further include the end effector 260 installed on any one 230 of the plurality of arms 210, 220 and 230.

The end effector 260 may be a robot hand or a gripper, and the end effector 260 may be mounted at the end of the robot arm 200 to perform various functions related to the cooking so that the robot arm 200 may perform various operations related to the cooking (hereinafter referred to as cooking operation).

The robot arm 200 may include at least one motor or at least one actuator capable of rotating the arms 210, 220 and 230, the arm connectors 240 and 250, and the end effector 260.

A robot arm R constituting the robot arm 200 may be variously configured without being limited to the number or shape of the plurality of arms 210, 220 and 230, at least one arm connector 240 and 250, the motor and the actuator as long as it can three-dimensionally move and rotate the end effector 260.

The robot arm 200 may further include a robot connector 270 that connects/supports another one 210 of the plurality of arms 210, 220 and 230 to another object around the cooking device 100e.

Another object to which the robot connector 270 is connected/supported may be the ingredient feeder 300 that is provided in a room in which the cooking device 100e is installed to supply ingredients required for cooking to the robot arm 200. In this case, the ingredient feeder 300 may supply the ingredient to the robot arm 200, and the robot arm 200 may receive the ingredient from the ingredient feeder 300 to use the ingredient for cooking.

Another object to which the robot connector 270 is connected/supported may be furniture(s) such as a shelf or a storage cabinet provided in the room in which the cooking device 100e is installed, or may be an ingredient feeder case 302 provided in the room in which the cooking device 100e is installed and formed therein with the ingredient feeder 300.

The robot arm 200 may be directly connected to the ingredient feeder 300 or may be connected to the ingredient feeder 300 through a connector such as a separate ingredient supply hose. It may be defined that the robot arm 200 is connected to the ingredient feeder 300, not only when the robot arm 200 is directly connected to the ingredient feeder 300, but also when the robot arm 200 is connected to the ingredient feeder 300 through a connector such as an ingredient supply hose.

One end of the ingredient channel P may be an ingredient inlet 281 through which the ingredient is introduced into the ingredient channel P, and the other end of the ingredient channel P may be an ingredient outlet 282 through which the ingredient introduced into the ingredient channel P comes out of the robot arm 200.

The robot arm 200 may be formed with an opening extending in the longitudinal direction of the robot arm 200. One example of the ingredient channel P may be the opening.

The opening may be formed in each of the robot connector 270, the arms 210, 220 and 230, the arm connectors 240 and 250, and the end effector 260 and the openings may be sequentially formed in the longitudinal direction of the robot arm 200 to communicate with each other. One example of the ingredient channel P may be formed by a combination of the openings sequentially located in the longitudinal direction of the robot arm 200.

Another example of the ingredient channel P may be formed by a hose or a tube T (hereinafter referred to as a tube) disposed through the opening formed in the robot arm 200. All or part of the tube T may be accommodated in the opening formed in the robot arm 200, and the ingredient channel P may be defined as the interior of the tube.

The robot arm 200 may be disposed to be spaced apart from the ingredient feeder 300, and the ingredient channel P may extend from the robot arm 200 to the ingredient feeder 300 so as to be connected to the ingredient feeder 300. In this case, the ingredient inlet 281 of the ingredient channel P may be connected to the ingredient feeder 300 at the outside of the robot arm 200.

The robot may include one robot arm 200a or may include a pair of robot arms 200a and 200b. The pair of robot arms 200a and 200b may cooperatively perform the cooking operation in a state in which they are spaced apart from each other, and when one of the two robots performs an ingredient input operation, the other one of the two robot arms may perform the other cooking operation instead of the ingredient input operation.

The ingredient channel P may be formed only in one of the pair of robot arms 200a and 200b, and the robot arm formed with the ingredient channel P between the robot arms 200a and 200b may perform various cooking operations including the ingredient input operation, and the robot arm in which the ingredient channel P is not formed between the pair of robot arms 200a and 200b may perform the other cooking operation instead of the ingredient input operation.

The ingredient channel P may be formed in both of the pair of robot arms 200a and 200b. In this case, the pair of robot arms 200a and 200b may input mutually different types of ingredients into the cooking container F during the entire cooking operation and may input the ingredient into the cooking container F at different times or simultaneously during the entire cooking operation.

The number of robot arms formed with the ingredient channel P may not be limited, and the robot arms will be denoted with reference numeral 200 in the following description.

Meanwhile, the robot arm 200 may be directly connected to the ingredient feeder 300, and the ingredient channel P may be provided inside the robot arm 200. In this case, the ingredient inlet 281 of the ingredient channel P may be connected to the ingredient feeder 300 at the robot arm 200, in particular, at the robot connector 260.

The robot arm 200 is not always connected to the ingredient feeder 300, but may be connected to the ingredient feeder 300 when the ingredient is supplied from the ingredient feeder 300.

The ingredient feeder 300 may process the food ingredient into a size and a shape that is easy to transfer. For example, the ingredient feeder 300 may process the food ingredient into a ball-shaped solid ingredient B. The ingredient feeder 300 may supply the solid ingredient B to the ingredient channel P, and the solid ingredient B may be introduced into the cooking container F through the ingredient outlet 282 of the ingredient channel P by passing through the ingredient channel P.

The ingredient channel P may be configured to quickly guide the ingredient supplied from the ingredient feeder 300, and it is advantageous that the ingredient that comes out through the ingredient outlet 282 is not discharged at too high a speed.

In addition, the ingredient feeder 300 may process the ingredient into a size smaller than a sectional area of the ingredient channel P, and the ingredient processed by the ingredient feeder 300 to a size smaller than the sectional area of the ingredient channel P may come out of the robot arm 200 by passing through the ingredient channel (P).

Figure 6:
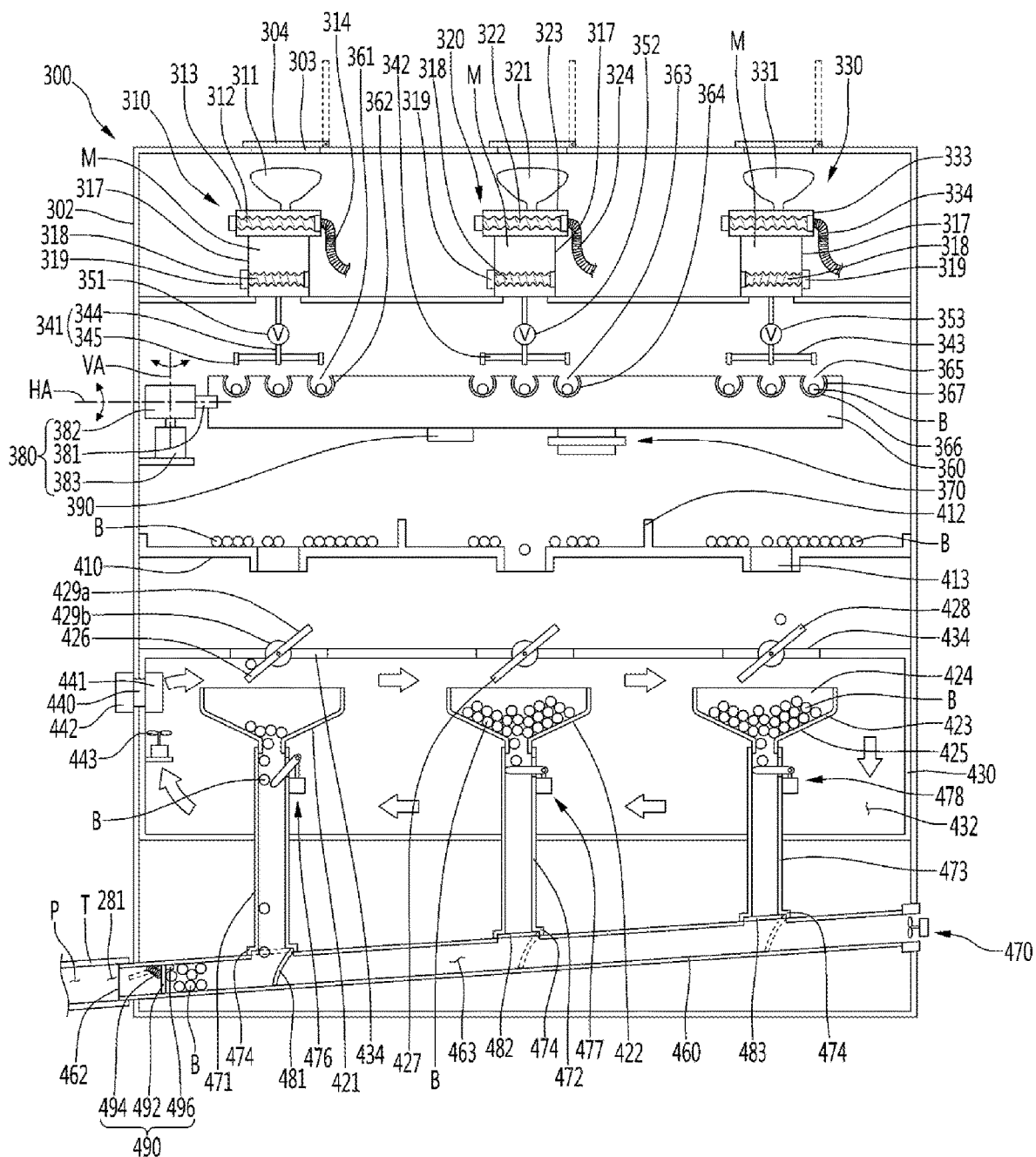
FIG. 6 is a view illustrating an interior of an ingredient feeder according to an embodiment.

FIG. 6 is a view illustrating the inside of the ingredient feeder according to an embodiment.

The food ingredient processed by the ingredient feeder 300 may be various ingredients required for food cooking. For example, the food ingredient may be a solid ingredient such as cucumber, carrot, onion, meat, red pepper, pepper, salt, or red pepper powder, or may be a liquid ingredient such as soy sauce, vinegar, and red pepper paste.

The solid ingredient may be classified into a powder ingredient such as pepper, salt and red pepper powder, and a general solid ingredient having a larger size than the powder ingredient. Examples of the general solid ingredient may be cucumber, carrot, onion, meat, and the like.

Among the solid ingredients, the solid ingredient having a smaller size than the ingredient channel P may be an ingredient that does not require grinding, and may be a powder ingredient such as pepper, salt, red pepper powder, and the like. In the following description, the above ingredients will be referred to as a powder ingredient for the sake of convenience.

The solid ingredient having a large size than the ingredient channel P in the solid ingredients may be an ingredient that needs to be ground to be processed to a size smaller than the sectional area of the ingredient channel P. For example, the solid ingredient having the large size than the ingredient channel P may be a general solid ingredient such as cucumber, carrot, onion, meat, etc. In the following description, these ingredients will be described as solid ingredients for the sake of convenience.

The ingredient feeder 300 may process a mixture M, in which the food ingredient is mixed with water, into the solid ingredient B, and supply the solid ingredient B to the ingredient channel P.

The ingredient feeder 300 may include at least one processor and an ingredient mold 360.

The ingredient feeder 300 may include an ingredient feeder case 302 forming an external appearance, and various components of the ingredient feeder 300 may be accommodated in the ingredient feeder case 302.

The ingredient feeder case 302 may be formed with an ingredient input port 303 for inputting the food ingredient from the outside. The ingredient feeder 300 may further include an ingredient input door 304 disposed in the ingredient feeder case 302 to open or close the ingredient input port 303. The ingredient input door 304 may be rotatably or slidably disposed in the ingredient feeder case 302 to open or close the ingredient input port 303. The ingredient input port 303 and the ingredient input door 304 may be provided for each processor.

The processor produces the mixture M by mixing the food ingredient with water and the processor may mix various food ingredients with water to primarily process into the mixture M of the ingredient and water.

The ingredient mold 360 may secondary process the mixture M produced by the processor into a solid ingredient B of a predetermined size and a predetermined shape.

The ingredient mold 360 may be spaced apart from the processor. The ingredient mold 360 may be formed with a space portion defining a space in which the mixture supplied from the processor is accommodated. The space portion may be formed in a shape recessed in the ingredient mold 360.

The mixture M produced by the processor may be supplied to the space portion and accommodated in the space portion and may be processed into the same or similar shape as the shape of the space portion in the space portion.

The ingredient feeder M may be provided with a plurality of processors 310, 320 and 330. The plurality of processors 310, 320 and 330 may process the same kind of food ingredient.

All or part of the plurality of processors 310, 320 and 330 may process different kinds of food ingredients. For example, one 310 of the plurality of processors 310, 320 and 330 may mix the solid ingredient with water, and another one 320 of the plurality of processors 310, 320 and 330 may mix the powdered ingredient with water, and another one 330 of the plurality of processors 310, 320 and 330 may mix the liquid ingredient with water.

The plurality of processors 310, 320 and 330 may include a solid ingredient processor 310 that produces a mixture by mixing the solid ingredient with water while grinding the solid ingredient. The plurality of processors 310, 320 and 330 may include a powder ingredient processor 320 for mixing the powder ingredient with water to produce a mixture. The plurality of processors 310, 320 and 330 may include a liquid ingredient processor 330 that mixes the liquid ingredient with water to produce a mixture.

The solid ingredient processor 310, the powder ingredient processor 320, and the liquid ingredient processor 330 may be provided in singular or plural in the ingredient feeder.

Each of the solid ingredient processor 310, the powder ingredient processor 320, and the liquid ingredient processor 330 may produce a mixture of food ingredients mixed with water. In the following description, the processors 310, 320 and 330 will be described when explaining the common configuration and the solid ingredient processor 310, the powder ingredient processor 320 and the liquid ingredient processor 330 will be distinguishably described when explaining the different configurations.

The processors 310, 320 and 330 may include a storage container 317 in which the produced mixture is contained, a rotating body 318 rotatably disposed in the storage container 317 to allow the mixture contained in the storage container to flow, and a motor 319 to rotate the rotating body 318.

The storage container 317, the rotating body 318 and the motor 319 may allow the mixture M to flow in the storage container 317 such that the mixture M may be kept in a shape of a slush or similar to the slush without being solidified.

The storage container 317, the rotating body 318 and the motor 319 may be provided regardless of the type of the processor and denoted with the same reference numerals regardless of the type of the processor.

The solid ingredient processor 310, which is one example of the processor, may include a solid ingredient inlet 311 into which solid ingredients are introduced from among the food ingredients, a grinder 311 configured to contain the solid ingredients introduced into the solid ingredient inlet 311 and provided therein with a grinding rotor 312 rotatably installed, a water tube 314 configured to guide water into the grinder, and a storage container 317 configured to contain a mixture of water and the solid ingredients, which are pulverized in the grinder 313, in the form of a slush. The rotating body 318 rotated by a motor 319 may be provided in the storage container 317.

The powder ingredient processor 320, which is another example of the processor, may include a powder ingredient inlet 321 into which powder ingredients having a size smaller than a size of solid ingredients are introduced from among the food ingredients, a mixer 323 configured to contain the powder ingredients introduced into the powder ingredient inlet 321, in which a conveying screw 322 is rotatably installed in the mixer 323, a water tube 324 configured to guide water into the mixer 323, and a storage container 317 configured to contain a mixture of liquid ingredients and the water mixed in the mixer 323. The rotating body 318 rotated by a motor 319 may be provided in the storage container 317.

The liquid ingredient processor 330, which is still another example of the processor, may include a liquid ingredient inlet 331 into which liquid ingredients are introduced from among the food ingredients, a mixer 333 configured to contain the liquid ingredients introduced into the liquid ingredient inlet 331, a water tube 334 configured to guide water into the mixer 333, and a storage container 317 configured to contain a mixture of the liquid ingredients and the water mixed in the mixer 333. The rotating body 318 rotated by a motor 319 may be provided in the storage container 317.

The ingredient feeder M may further include a mixture guide configured to guide the mixture produced in the processors 310, 320 and 330 into the space portion of the ingredient feeder 300.

The mixture guide may be connected to the storage container 317 and may guide the mixture of the storage container 317 to a plurality of space portions formed in the ingredient mold.

When the ingredient feeder 300 includes a plurality of processors 310, 320 and 330, the ingredient feeder 300 may include a plurality of mixture guides 341, 342 and 343. The plurality of processors 310, 320 and 330 may correspond to the plurality of mixture guides 341, 342 and 343 in one to one correspondence.

The plurality of mixture guides 341, 342, and 343 may include a first mixture guide 341 connected to the storage container 317 of the solid ingredient processor 310, a second mixture guide 342 connected to the storage container 317 of the powder ingredient processor 320, and a third mixture guide 343 connected to the storage container 317 of the liquid ingredient processor 330.

The first mixture guide 341, the second mixture guide 342, and the second mixture guide 343 will be referred to as the mixture guides 341, 342, and 343 when describing the common configuration.

The mixture guides 341, 342 and 343 may include a common guide 344 connected to the processors 310, 320 and 330, and a plurality of branch guides 345 branching from the common guide 344. The plurality of branch guides 345 may disperse the mixture guided through the common guide 344.

The ingredient feeder 300 may further include a feed valve disposed in the processor or the mixture guide.

The feed valve may be disposed at the mixture outlet formed in the storage container 317 of the processor, and may be disposed between the mixture outlet and the common guide 314, or may be disposed at the common guide 314.

The feed valve may allow the mixture of the processor to be supplied to the ingredient mold 360 and prevent the mixture of the processor from being supplied to the ingredient mold 360. One example of the feed valve may be a solenoid valve. However, the feed valve of the present disclosure is not limited to the solenoid valve, but various types of feed valves may be used as long as the feed valves can control the mixture in the storage container 317.

When the ingredient mold 360 includes a plurality of processors 310, 320 and 330, the feed valve may be provided for each of the processors 310, 320 and 330. The plurality of processors 310, 320, and 330 may include a first feed valve 351 configured to control the mixture produced by the solid ingredient processor 310, a second feed valve 352 configured to control the mixture produced by the powder ingredient processor 320, and a third feed valve 353 configured to control the mixture produced by the liquid ingredient processor 330. The first feed valve 351, the second feed valve 352, and the third feed valve 353 will be described as the feed valves 351, 352, and 353 when explaining the common configuration.

The ingredient mold 360 cools the food ingredient into a solid ingredient, in which the mixture of the food ingredient and water processed in the processors 310, 320 and 330 may be cooled by the ingredient mold 360, and processed into a solid processed ingredient M having a predetermined shape. Since the solid processed ingredient is in a solid state, the solid processed ingredient will be referred to as a solid ingredient (B) below.

When a plurality of processors 310, 320 and 330 are provided, the number of ingredient molds 360 may be smaller than the number of processors 310, 320 and 330. One ingredient mold 360 may cool the mixtures produced in the plurality of processors 310, 320 and 330 together.

Meanwhile, the present disclosure is not limited to one ingredient mold 360, but may include a plurality of ingredient molds. The ingredient mold may be provided for each of the processors 310, 320 and 330. Hereinafter, the description will be made with respect to one ingredient mold 300 for the sake of convenience.

The space defined by the space portions of the ingredient mold 360 may be a mold space for freezing the mixture into a predetermined shape. The ingredient mold 360 may have a three-dimensional shape, and the space portion may be formed on one surface of the ingredient mold 360.

The mold space may be formed in the ingredient mold 360 for each of the plurality of processors, and a plurality of space portions may be provided in the ingredient mold 360. The plurality of space portions may be formed together on one surface of the ingredient mold 360. The plurality of space portions may be formed on the top surface of the ingredient mold 360.

When the ingredient mold 360 includes the first, second and third processors 310, 320 and 330, the ingredient mold 360 may be formed with a plurality of first space portions 362 having a space 361 in which the mixture supplied from the first processor 310 is accommodated, a plurality of second space portions 364 having a space 363 in which the mixture supplied from the second processor 320 is accommodated, and a plurality of third space portions 366 having a space 365 in which the mixture supplied from the third processor 330 is accommodated.

The plurality of first space portions 362 may correspond to the plurality of branch guides 345 of the first mixture guide 341 in one to one correspondence, and the mixture passing through the first mixture guide 341 may be dispersively accommodated in the plurality of first space portions 362.

The plurality of second space portions 364 may correspond to the plurality of branch guides 345 of the second mixture guide 342 in one to one correspondence, and the mixture passing through the second mixture guide 342 may be dispersively accommodated in the plurality of second space portions 364.

The plurality of third space portions 366 may correspond to the plurality of branch guides 345 of the third mixture guide 343 in one to one correspondence, and the mixture passing through the third mixture guide 343 may be dispersively accommodated in the plurality of third space portions 366.

The plurality of first space portions 362, the plurality of second space portions 364, and the plurality of third space portions 366 may have the same shape and size, and the plurality of first space portions 362, the plurality of second space portions 364, and the plurality of third space portions 366 may be described as space portions 362, 364 and 366 when explaining the common configuration.

The shape of the solid ingredient may be determined by the shape of the space portions 362, 364 and 366, and the space portions 362, 364 and 366 may have sectional shapes of circular balls or elliptical balls.

The space portions 362, 364, 366 may have sectional shapes of semi-circles or arcs, in particular, major arcs.

The ingredient mold 360 may include a coating layer 367 formed on the space portions 362, 364, 366. The coating layer 367 may be one selected from the group consisting of titanium, marble and diamond. The coating layer 367 may be formed in each of the plurality of space portions 362, 364 and 366, and may have the shape the same as the space portions 362, 364 and 366. If the ingredient mold 360 includes the coating layer 367, the space in which the mixture is accommodated may be substantially defined by the coating layer 367.

The ingredient feeder 300 may further include a cooler 370 configured to cool the ingredient mold 360.

Cooler 370 may include a thermoelectric element secured to the ingredient mold 360.

The cooler 370 may be disposed on the side or the bottom of the ingredient mold 360. The ingredient mold 360 may be formed with a thermoelectric element accommodating groove into which the thermoelectric element is accommodated, and the thermoelectric element may be inserted into and accommodated in the thermoelectric element accommodating groove.

The ingredient feeder 300 may include a rotating device 380 for rotating the ingredient mold 360. The rotating device 380 may rotate the ingredient mold 360 in a plurality of directions different from each other.

The rotating device 380 may three-dimensionally shake the ingredient mold 360. When the rotating device 380 operates, the mixture contained in the space portions 362, 364 and 366 may three-dimensionally flow in the space portions 362, 364 and 366 while losing heat by the space portions 362, 364 and 366. Water components in the mixture may be embanked due to heat absorption of the ingredient mold 360, the shape of the space portions 362, 364 and 366, and the three-dimensional shaking of the ingredient mold 360.

If the heat absorption of the ingredient mold 360 and the shaking of the ingredient mold 360 continue for a predetermined time, the slush-type mixture that has been supplied to the space portions 362, 364 and 366 may be processed into a ball-shaped solid ingredient.

The rotating device 380 includes a rotating shaft 381 connected to the ingredient mold 360, a first motor 382 for rotating the rotating shaft 381 in the first direction, and a second motor 383 for rotating the rotating shaft 381 in the second direction different from the first direction.

The rotating shaft 381 may be a horizontal shaft connected to one side of the ingredient mold 360.

The first motor 382 may rotate the ingredient mold 360 such that the ingredient mold 360 is tilted about a horizontal axis HA. When the first motor 382 is driven, the ingredient mold 360 may rotate forward and backward about the horizontal axis HA.

The second motor 383 may rotate the first motor 382 such that the first motor 382 and the ingredient mold 360 may rotate about the vertical axis VA. When the second motor 383 is driven, the first motor 382 and the ingredient mold 360 may rotate forward and backward about the vertical axis VA.

When the first motor 382 is driven, if the second motor 383 is driven together, the ingredient mold 360 may be tilted about the vertical axis VA, and the ingredient mold 360 may cool the mixture M contained in the space portions 362, 364 and 366 into a ball shape while gently rolling the mixture M.

The rotating device 380 may turn over the ingredient mold 360. The rotating device 380 may turn over the ingredient mold by 180° about the horizontal axis HA such that the surface (for example, the upper surface) on which the space portions 362, 364 and 366 of the ingredient mold 360 are formed faces downward. When the surface of the ingredient mold 360 on which the space portions 362, 364, and 366 are formed faces downward, the ball-shaped solid ingredient B accommodated in the space portions 362, 364 and 366 may fall downward.

The rotating device 380 may stop the operation of the second motor 383 when the first motor 382 and the second motor 383 have been driven for a predetermined time. In addition, after the operation of the second motor 383 is stopped, the first motor 382 may rotate the rotating shaft 381 by 180° and then restore the rotating shaft 181.

An exciter 390 may be installed on the ingredient mold 360. The exciter 390 may apply a vibration to the ingredient mold 360 so prevent the mixture cooled in the space portions 362, 364 and 366 from being attached to the space portions 362, 364 and 366. The exciter 390 may be installed on one side of the ingredient mold 360. The ingredient mold 360 may be formed with an exciter receiving groove in which the exciter 390 is accommodated, and the exciter 390 may be inserted into and accommodated in the exciter receiving groove. One example of the exciter 390 may include a high frequency generator fixed to the ingredient mold 360. Meanwhile, the exciter 390 is not limited to the high frequency generator, and various types of exciters can be used as long as the exciters can excite the ingredient mold 360.

The processors 310, 320 and 330 and the ingredient mold 360 may constitute a processing module for processing the food material into the solid ingredient, and the solid material processed in the processing module may be temporarily stored in the storage container.

The ingredient feeder 300 may include a common storage container 410 in which the solid ingredient transferred from the ingredient mold 360 is stored.

The common storage container 410 may include a barrier 412 that divides the common storage container 410 into a plurality of storage spaces such that storage spaces are formed for each of the processors 310, 320, and 330.

The common storage container 410 may be spaced apart from the ingredient mold 260 in the vertical direction at the lower portion of the ingredient mold 260. When the upper surface of the ingredient mold 260 faces downward, the ball-shaped solid ingredient B falling down from the space portions 362, 364 and 366 of the ingredient mold 260 may fall into the common storage container 410.

The common storage container 410 may be formed with an opening 413 at the lower side of the storage space, in which the ball-shaped solid ingredient falls into the opening 413. The openings 413 may be formed for each storage space, and the number of the openings 413 may be equal to the number of storage spaces.

The ingredient feeder 300 may not include the common storage container 410 separately. In this case, the solid ingredient B falling onto the ingredient mold 360 may fall down toward the storage space 424 of the storage containers 421, 422, and 423 described below.

The ingredient feeder 300 may be formed with an ingredient port 462 for discharging the processed ingredient. The ingredient feeder 300 may process the ingredient such that the ingredient has a size smaller than a sectional area of the ingredient channel P, and then discharge the processed ingredient B to the ingredient port 462.

The robot arm 200 shown in FIGS. 4 and 5 may receive the solid ingredient B from the ingredient port 462, and the supplied solid ingredient may be guided to the ingredient channel P.

The robot arm 200, in particular, the ingredient inlet 281 of the ingredient channel P may be connected to the ingredient port 462 of the ingredient feeder 300. The ingredient processed in the ingredient feeder 300 may be supplied to the ingredient channel P through the ingredient port 462 and the ingredient inlet 281.

The ingredient feeder 300 may include a transfer module (or dispenser module) for moving the ball-shaped solid ingredient B processed in the ingredient mold 260 to the robot arm 200.

The ingredient feeder 300 may further include at least one storage container in which the solid ingredient moved from the ingredient mold 260 is contained.

The ingredient feeder 300 may include a plurality of storage containers 421, 422, and 423. The plurality of storage containers 421, 422, and 423 may include a first storage container 421 in which an ingredient processed in the first space portion 362 is accommodated. The plurality of storage containers 421, 422, and 423 may include a second storage container 422 in which the ingredient processed in the second space portion 364 is accommodated. The plurality of storage containers 421, 422, and 423 may include a third storage container 423 in which the ingredient processed in the third space portion 366 is accommodated.

The plurality of storage containers 421, 422, and 423 may be spaced apart from each other. The plurality of storage containers 421, 422, 423 may be spaced apart from each other in the horizontal direction. The first storage container 421, the second storage container 422, and the third storage container 423 may have the same structure and shape. In the following description, the first, second and third storage containers may be described as the storage containers 421, 422, and 423 when explaining the common configuration.

Storage spaces 424 in which the solid ingredient B is stored may be formed in the storage containers 421, 422, and 423. An upper portion of the storage space 424 may have a shape that gradually narrows downward. The storage containers 421, 422, and 423 may include an upper storage part 425 having a size gradually reduced downward and a trapezoidal sectional shape. The solid ingredient moved from the ingredient mold 260 to the storage containers 421, 422 and 423 may be temporarily stored in the storage space 424.

The solid ingredient B falling down from the ingredient mold 260 or the common storage container 410 may be directly dropped into the storage containers 421, 422, and 423, and moved to the storage containers 421, 422, and 423 while being guided by a separate guide.

The ingredient feeder 300 may further include a guide for guiding the solid ingredient dropped from the ingredient mold 260 into the storage space 424. The guide may be disposed between the ingredient mold 260 and the storage container. The guide may have an inclined surface 429a inclined toward the storage space 424. The inclined surface 429a may be an upper surface of the guide. The guide may be placed on the storage container while being tilted. A lower end of the guide may face the storage space 424.

The guide may be rotatably disposed on the storage container, and may be rotated to open or close the opening 434 of the cooling chamber 430 which will be described below. The guide may be connected to a rotating device 429b such as a motor capable of rotating the guide. The rotating device 429b may rotate the guide such that a lower end of the guide faces the storage space 242, and may rotate the guide to seal the opening 434 by blocking the opening 434.

The ingredient mold 300 may include a plurality of guides 426, 427 and 428. The plurality of guides 426, 427, and 428 may be provided for the storage containers 421, 422, and 423, respectively. The guides 426, 427 and 428 may correspond to the storage containers 421, 422, and 423 in one to one correspondence.

The plurality of guides 426, 427, and 428 may include a first guide 426 for guiding the solid ingredient to the first storage container 421, a second guide 427 for guiding the solid ingredient to the second storage container 422, and a third guide 428 for guiding the solid ingredient into the third container 423.

The ingredient feeder 300 may further include a cooling chamber 430 in which the storage container is accommodated while being kept in a low temperature condition. The cooling chamber 430 may have a cooling space 432 to accommodate the storage container.

The cooling chamber 430 may be an adiabatic chamber having a cooling space 432 formed therein, and may be formed at an upper portion thereof with an opening 434 through which the solid ingredient passes.

The ingredient mold 360 may be disposed on the cooling chamber 340 while being spaced apart from the storage container.

The cooling chamber 430 may have an opening 434 formed at an upper portion of the storage container.

The opening 434 may be formed between the ingredient mold 360 and the storage container in the cooling chamber 430, and the solid ingredient falling down from the ingredient mold 36 may move to the storage containers 421, 422 and 433 by passing through the opening 434.

The opening 434 may be formed for each of the storage containers 421, 422, 433. The cooling chamber 430 may include a first opening formed above the first storage container 421, a second opening formed above the second storage container 422, and a third opening formed above the third storage container 423.

The ingredient feeder 300 may further include a cooler 440 that can cool the storage container. The cooler 440 may be installed to cool the cooling space 432. The cooler 440 may be configured as a refrigeration cycle apparatus including a compressor, a condenser, an expansion device, and an evaporator, and may also be configured as a thermoelectric element including a heat absorption body 441 and a heat dissipation body 442.

The ingredient feeder 300 may further include a cooling fan 443 which circulates the air in the cooling chamber 430 to the evaporator or the heat absorption body and then circulates the air into the cooling chamber 430.

In the ingredient feeder 300, the evaporator or the heat absorption body may be attached to the storage container such that the evaporator or the heat absorption body can absorb the heat of storage container in a conductive manner.

Ingredient feeder 300 may include a feed tube 460. The feed tube 460 may be formed with an ingredient port 462 and a passage 463 to guide the ingredient to the ingredient port 462.

The feed tube 460 may be inclined in a direction that is gradually lowered toward the ingredient port 462.

The passage 433 may be a space in which the solid ingredient may be moved, or may be a space in which the solid ingredient may be temporarily received/stored. The solid ingredient B stored in the storage container may be moved to the feed tube 360 and stored in the feed tube 360, and then moved to the outside through the ingredient port 462 of the feed tube 360.

The ingredient feeder 300 may further include a solid ingredient transfer device for forcibly moving the solid ingredient. The solid ingredient transfer device may forcibly move the solid ingredient B in the feed tube 460 toward the ingredient port 462.

One example of the solid ingredient transfer device may include a push body movably accommodated in the feed tube 360 to push the solid ingredient in the feed tube 460, and a linear moving device, such as a motor, connected to the push body to linearly move the feed tube 360.

The push body may move forward in the direction in which the ingredient port 462 is located to push the solid ingredient in the feed tube 360 towards the ingredient port 462. The push body may be retracted in the direction opposite to the ingredient port 462.

Another example of the solid ingredient transfer device may be a feeder 470 that supplies a high pressure fluid to the passage 463 such that the solid ingredient in the passage 463 is moved by the high pressure fluid.

The ingredient feeder 300 may include a feeder 470 for moving the solid ingredient moved to the feed tube 460 to the ingredient port 462. The feeder 470 may move the solid ingredient to the ingredient port 462 by the pressure of the air, and an example of the feeder 470 may include a blower for supplying air to the passage 463. The blower may be disposed opposite to the ingredient port to provide pneumatic pressure to the passage. For the sake of convenience, the feeder and the blower will be denoted with reference numeral 470.

The blower 470 may be installed opposite to the ingredient port 462 and may flow high pressure air into the passage 463. The high pressure air flowing from the blower 470 into the passage 463 can function as a solid ingredient carrier that causes the solid ingredient in the passage 463 to flow toward the ingredient port 462.

The ingredient feeder 300 may further include a transfer tube connecting the storage containers 421, 422 and 423 and the feed tube 460. The transfer tube may guide the solid ingredient B stored in the storage container to the passage 463 of the feed tube 460. An upper portion of the transfer tube may be connected to the storage container, a lower portion of the transfer tube may be connected to the feed tube 460 and the solid ingredient in the storage container may be moved to the passage 463 of the feed tube 460 by passing through the transfer tube.

A plurality of transfer tubes may be provided and the plurality of transfer tubes may correspond to the storage containers 421, 422, and 423 in one to one correspondence. The plurality of transfer tubes may include a first transfer tube 471 connecting the first storage container 421 and the feed tube 460, a second transfer tube 472 connecting the second storage container 422 and the feed tube 460, and a third transfer tube 473 connecting the third storage container 423 and the feed tube 460.

Hereinafter, the first transfer tube 471, the second transfer tube 472, and the third transfer tube 473 will be described as the transfer tubes 471, 472, and 473 when explaining the common configuration.

Each of the plurality of transfer tubes 471, 472 and 473 may include a connection terminal 474 connected to the feed tube 460. The connection terminals 474 of the plurality of transfer tubes 471, 472, and 473 may be spaced apart from each other in the longitudinal direction of the feed tube 460.

The plurality of storage containers 421, 422, and 423 may be arranged in parallel to each other to have the same height, and the plurality of transfer tubes 471, 472, and 473 may have lengths which increase as they are closer to the ingredient port 462.

The ingredient feeder 300 may further include a control valve for controlling the drop of the solid ingredient located in the storage container.

The control valve may open or close the interior of the transfer tubes 471, 472 and 473 in the movement direction of the solid ingredient.

When the ingredient feeder 300 includes a plurality of storage containers 421, 422, and 423, the ingredient feeder 300 may include a plurality of control valves 476, 477, and 478. The plurality of control valves 476, 477, and 478 may include a first control valve 476 to control the solid ingredient moved to the first transfer tube 471, a second control valve 477 to control the solid ingredient moved to the second transfer tube 472, and a third control valve 478 to control the solid ingredient moved to the third transfer tube 473.

Hereinafter, the first control valve 476, the second control valve 477 and the third control valve 478 will be described as the control valves 476, 477 and 478 when explaining the common configuration.

The control valves 476, 477 and 478 may be disposed at the outlet of the storage containers 421, 422 and 423 or at the top of the transfer tube.

The control valves 476, 477 and 478 may be opened and closed for a time during which the plurality of solid ingredients in the storage container drop one by one.

The controller 180 may count the number of operations of the control valves 476, 477 and 478. The controller 180 may stop the opening/closing operation of the control valve to stop the input of the ingredient when the number of times of the operation is equal to or more than the preset number of times.

The ingredient feeder 300 may further include an intermediate valve disposed at a lower portion of the transfer tube. The intermediate valve may be an elastic plug that opens the transfer tube while being deformed by the solid ingredient dropped from the storage container.

The intermediate valve may be a one-way valve that prevents air in the feed tube 460 from entering the transfer tubes 471, 472 and 473, and allows the solid ingredient in the transfer tubes 471, 472 and 473 to move to the feed tube 460.

A plurality of intermediate valves may be provided, and the plurality of intermediate valves may be provided for each of the transfer tubes 471, 472, and 473. The plurality of intermediate valves may include a first intermediate valve 481 disposed in the first transfer tube 471, a second intermediate valve 482 disposed in the second transfer tube 472, and a third intermediate valve 483 disposed in the third transfer tube 473.

The ingredient feeder 300 may further include a variable stopper 490. The variable stopper 490 may be disposed in the passage 464. The variable stopper 490 may prevent the solid ingredient from moving to the ingredient outlet 362 when the operation of the feeder 470 is stopped. The variable stopper 490 may allow the solid ingredient to move to the ingredient port 462 during the operation of the feeder 470.

The variable stopper 490 may be a valve device that is opened or closed by the feeder 470.

The variable stopper 490 may include a stopper 492 and a spring 494.

The stopper 492 may be rotatably disposed in the passage 463.

The spring 494 may elastically support the stopper 492 such that the stopper 492 rotates in the direction of blocking the passage 463.

The variable stopper 490 may further include a limiter 496 disposed in the passage 463 and latched when the stopper 492 is in a direction of blocking the passage 463.

The feeder 470 may include a blower for blowing air having a preset pressure or above to the stopper 492. The preset pressure may be a pressure that causes the stopper 492 to rotate in the direction of opening the passage 463.

Figure 7:
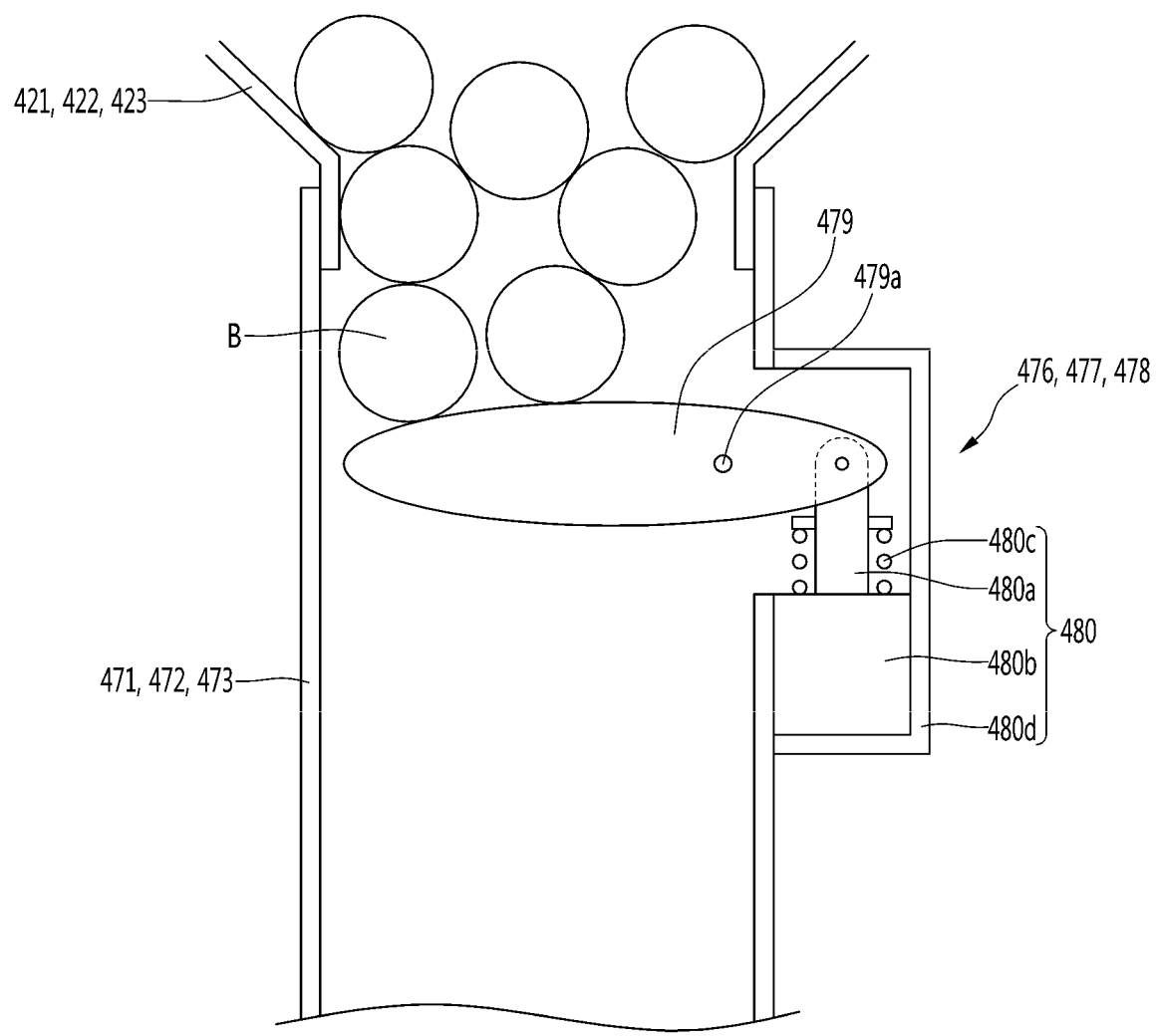
FIG. 7 is a view showing a state when a control valve shown in FIG. 6 does not allow transfer of a solid ingredient.
Figure 8:
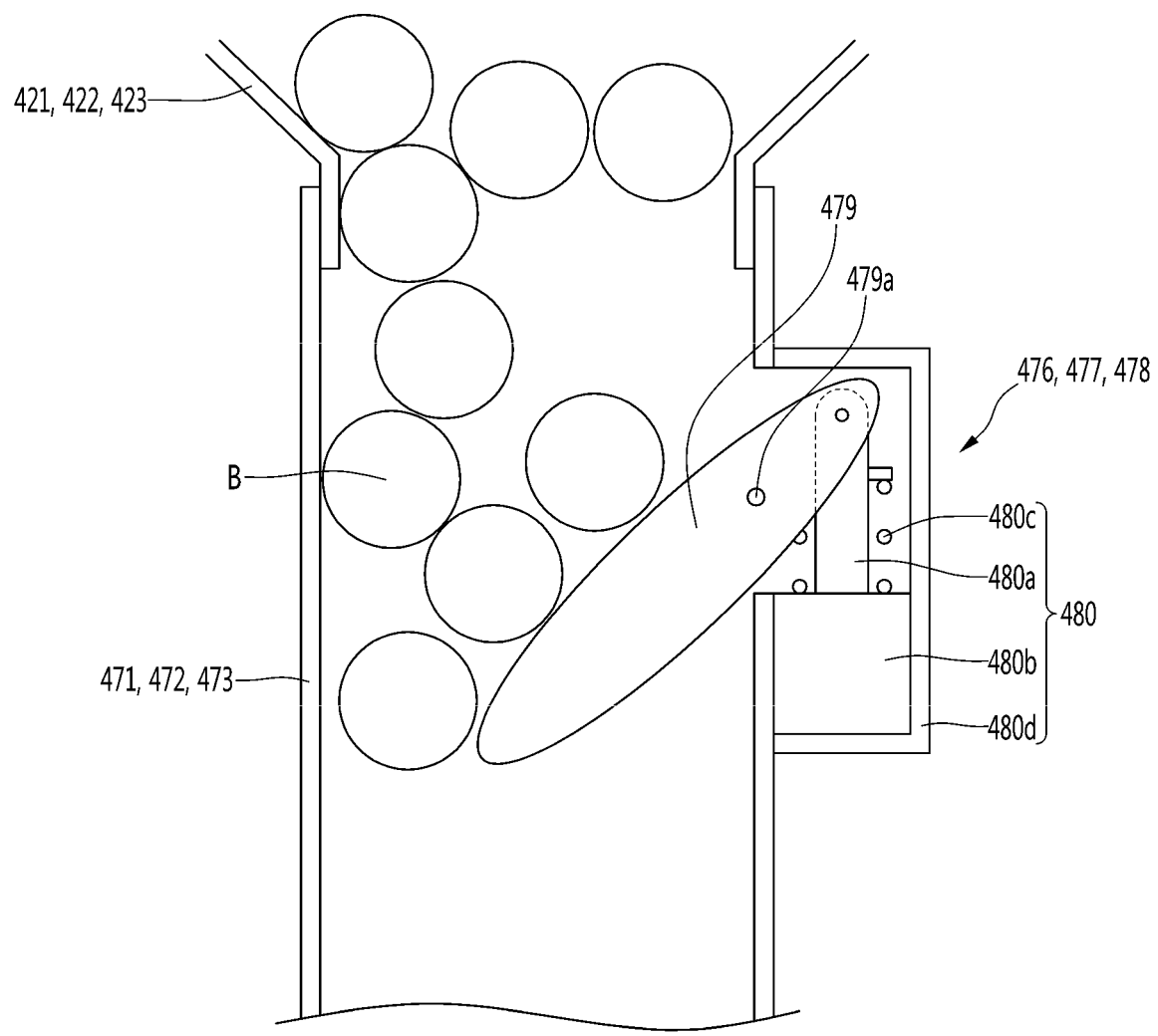
FIG. 8 is a view showing a state when a control valve shown in FIG. 6 allows transfer of a solid ingredient.

FIG. 7 is a view showing a state when a control valve shown in FIG. 6 does not allow the transfer of the solid ingredient, and FIG. 8 is a view showing a state when the control valve shown in FIG. 6 allows the transfer of the solid ingredient.

The control valves 476, 477 and 478 may include a valve body 479 rotatably disposed at an outlet of the storage containers 421, 422 and 423 or at an inside transfer tubes 471, 472 and 473, and a motor 480 for rotating the valve body 479.

The valve body 479 may include a rotating shaft 479a rotatably supported by the storage containers 421, 422 and 423, the transfer tubes 471, 472 and 473, or the motor 480 and may rotate about the rotting shaft 479a.

As shown in FIG. 7, the valve body 479 may be rotated about the rotating shaft 479a in a direction of blocking the inside of the transfer tubes 471, 472 and 473 and may prevent the solid ingredient B from moving to the feed tube 460 through the transfer tubes 471, 472 and 473.

As shown in FIG. 8, the valve body 479 may be rotated about the rotating shaft 479a in a direction of opening the transfer tubes 471, 472 and 473, and the solid ingredient B may fall to the lower side of the transfer tubes 471, 472 and 473 through the gap between the transfer tubes 471, 472, 473 and the valve body 479.

The motor 480 may rotate the valve body 479 clockwise or counterclockwise.

The motor 480 may be connected to the rotating shaft 479a to rotate the rotating shaft 479a, or may be connected to an object other than the rotating shaft 479a of the valve body 479.

The motor 480 may include a solenoid motor. The motor 480 may include a motor rod 480a connected to the valve body 479 to linearly move; and a solenoid 480b configured to linearly reciprocate the motor rod 480a as an electrical signal is applied thereto. The motor 480 may further include a spring 480c connected to the motor rod 480a to elastically support the motor rod 480a. The motor 480 may further include a motor housing 480d for accommodating the motor rod 480a, the solenoid motor 480b and the spring 480c.

The motor rod 480a may be rotatably connected to the valve body 479. When the motor rod 480a moves up, the valve body 479, as shown in FIG. 8, may be rotated counterclockwise about the rotating shaft 479a. When the motor rod 480a moves down, the valve body 479 may be rotated clockwise about the rotating shaft 479a as shown in FIG. 7.

The solenoid motor as described above may determine the rotation angle of the valve body 479 by the displacement of the motor rod 480a, and may be advantageous to drop the solid ingredient B having a ball shape of a predetermined size one by one.

Figure 9:
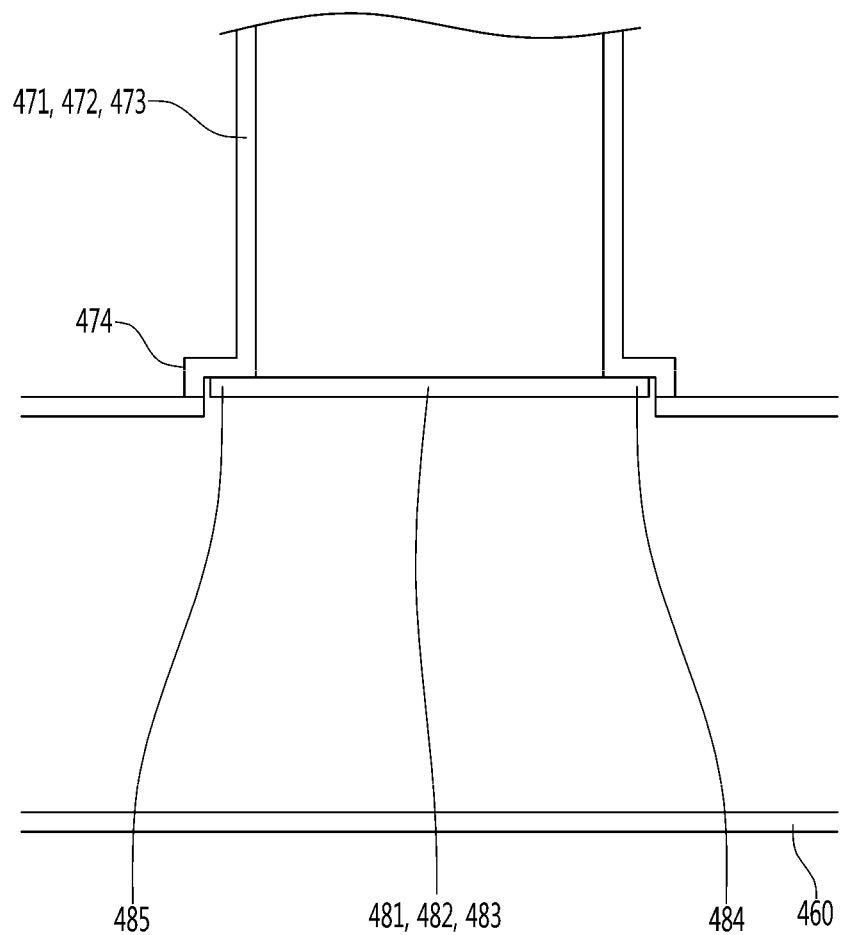
FIG. 9 is a view showing a state when an intermediate valve shown in FIG. 6 blocks an inside of a transfer tube.
Figure 10:
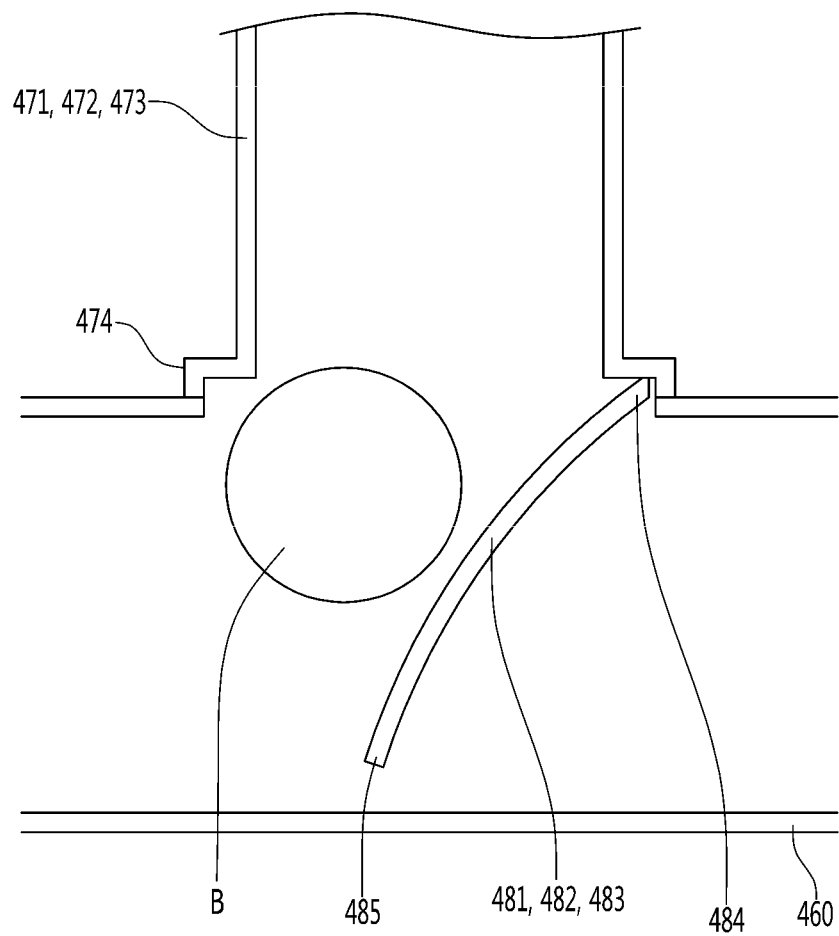
FIG. 10 is a view showing a state when an intermediate valve shown in FIG. 6 is deformed by a solid ingredient to open an inside of a transfer tube.

FIG. 9 is a view showing a state when an intermediate valve shown in FIG. 6 blocks an inside of a transfer tube and FIG. 10 is a view showing a state when an intermediate valve shown in FIG. 6 is deformed by a solid ingredient to open an inside of a transfer tube.

The intermediate valves 481, 482, 483 may include a valve body formed of an elastic material, and the valve body may be elastically deformed or restored to open or close the inside of the transfer tubes 471, 472 and 473.

The valve body of the intermediate valves 481, 482 and 483 may include a fixed end 484 fixed to the transfer tubes 471, 472 and 473 or the transfer tube 460, and a free end 485 located opposite to the fixed end 484.

The transfer tubes 471, 472 and 473 or the feed tube may include a latch step for constraining the free end 485 in the upward direction. For example, the latch step may be provided on the connection end 474.

If no external force (e.g., a pressing force of a solid ingredient) is applied to the intermediate valves 481, 482 and 483, as shown in FIG. 9, the fixed end 484 may be constrained in the upward direction by the transfer tubes 471, 472 and 472 or the feed tube 460, and the intermediate valves 481, 482 and 483 may block the inside of the transfer tubes 471, 472 and 473 from the inside the feed tube 460.

In a state in which the intermediate valves 481, 482 and 483 are arranged as shown in FIG. 9, if the solid ingredient B falls down through the transfer tubes 471, 472 and 473, the solid ingredient B may bend the intermediate valves 481, 482 and 483 by striking the intermediate valves 481, 482 and 483.

In this case, the fixed end 484 may be fixed to the transfer tubes 471, 472 and 473 or the feed tube 460, and the free end 485 may move into the feed tube 460. Thus, the intermediate valves 481, 482, and 483 may have curved sectional shapes, such as an arc, or bending may occur between the fixed end 484 and the free end 485.

The solid ingredient B may pass through the gap between the intermediate valves 481, 482 and 483 and the transfer tubes 471, 472 and 473, and between the intermediate valves 481, 482, and 483 and the feed tube 460 and may move into the feed tube 460 from the inside the transfer tubes 471, 472 and 473.

The intermediate valves 481, 482 and 483 may absorb the impact from the solid ingredient B dropped from the inside the transfer tubes 471, 472 and 473, and may assist the solid ingredient B such that the solid ingredient (B) can be dropped onto the feed tube 460 while lowering the drop speed.

Figure 11:
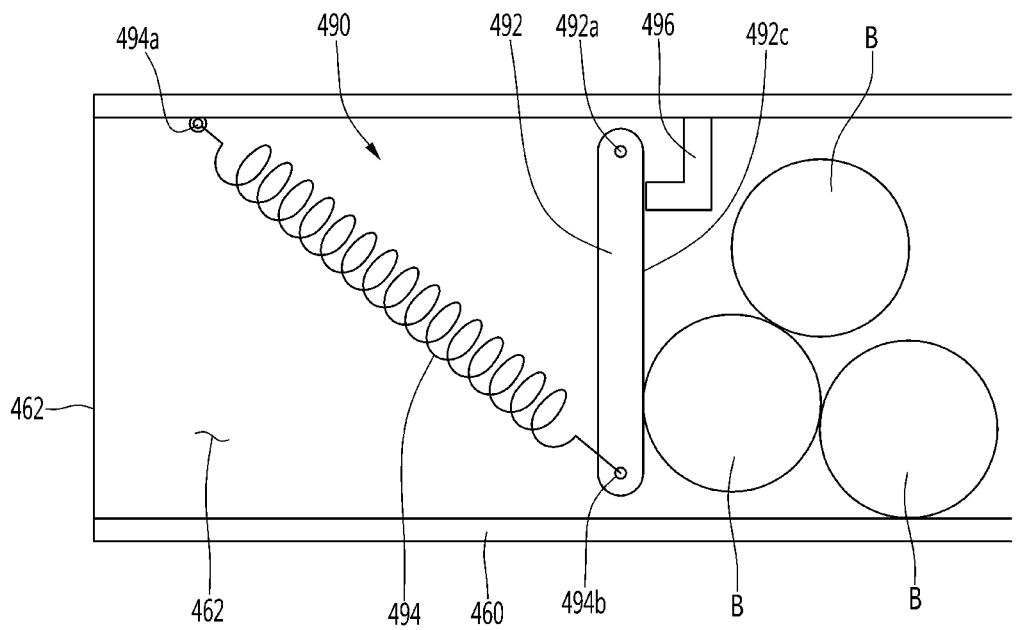
FIG. 11 is a view showing a state when a variable stopper shown in FIG. 6 does not allow transfer of a solid ingredient.
Figure 12:
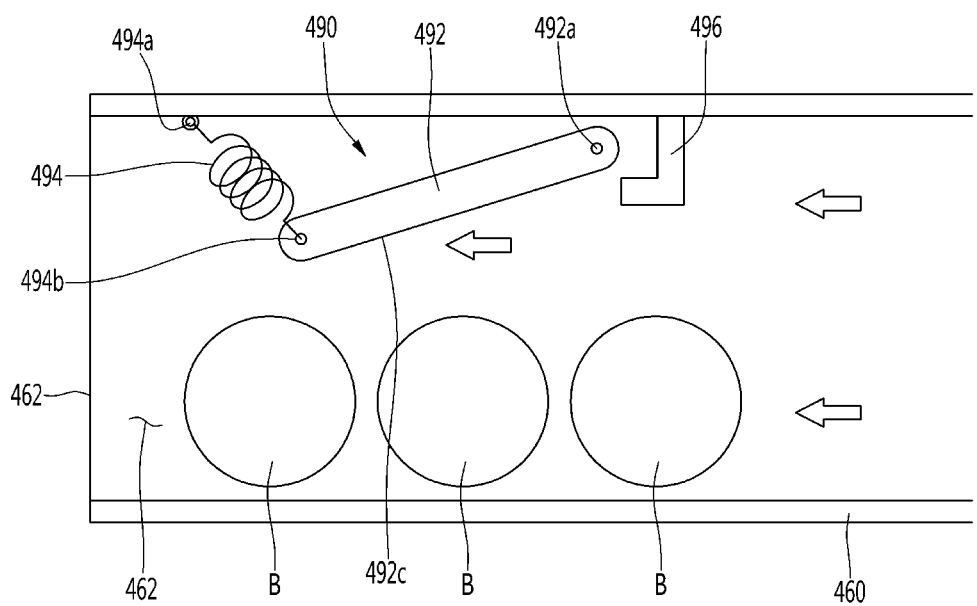
FIG. 12 is a view showing a state when a variable stopper shown in FIG. 6 allows transfer of a solid ingredient.

FIG. 11 is a view showing a state when a variable stopper shown in FIG. 6 does not allow the transfer of a solid ingredient and FIG. 12 is a view showing a state when a variable stopper shown in FIG. 6 allows the transfer of the solid ingredient.

The variable stopper 490 may be a mechanical valve that is opened or closed by the pressure of air, and may be a discharge valve or an outlet valve disposed adjacent to the ingredient port 462 to determine whether the ingredient is discharged through the ingredient port 462.

The stopper 492 may be rotated in the direction of blocking the passage 462 or in the direction of opening the passage 462, and may be a valve body capable of opening or closing the passage 462.

The stopper 492 may be rotatably accommodated in the passage 462 and may include a rotating shaft 492a rotatably connected to the feed tube 460. The stopper 492 may have a free end opposite to the rotating shaft 492a.

The stopper 492 may include a pressure surface 492c facing the feeder 470 in the longitudinal direction of the feed tube 460. When high pressure air is blown into the passage 463 from the feeder 470, the solid ingredient B positioned in the passage 463 or the high pressure air may act on the pressure surface 492c. The stopper 492 may be rotated according to the magnitude of the pressure acting on the pressure surface 492c.

A position between the stopper 492 and the feeder 470 in the inside of the feed tube 460 may be a solid ingredient receiving space in which the solid ingredient B may be gradually filled, and the solid ingredient B located in the solid ingredient receiving space may be moved to the ingredient port 462 by air supplied from the feeder 470.

The spring 494 may elastically support the stopper 492 such that the stopper 492 rotates in the direction of blocking the passage 462. The spring 494 may include a feed tube connection end 494a connected to the feed tube 460, and a stopper connection end 494b connected to the stopper 492.

The spring 494 may elastically support the stopper 492 to allow the stopper 492 to attenuate impact while rotating within a predetermined angular range when the solid ingredient B moved along the inclined feed tube 460 comes into contact with the stopper 492 or a plurality of solid ingredients B are gradually filled between the stopper 492 and the feeder 470.

The spring 494 may absorb the impact while being elastically deformed by the stopper 492 when high pressure air acts on the stopper 492 due to the driving of the feeder 470, and a gap may be formed between the stopper 492 and the feed tube 460 to allow the solid ingredient to pass through the gap.

The limiter 496 may limit the position of the stopper 492 to limit the over-rotation of the stopper 492. As the stopper 492 is rotated at an angle of blocking the passage 463, as shown in FIG. 10, the stopper 492 may be caught and constrained by the limiter 496. When the stopper 492 is rotated at an angle of opening the passage 463 as shown in FIG. 11, the stopper 492 may be spaced apart from the limiter 496.

According to an embodiment, since the food ingredient is processed into the solid ingredient and then transferred by the feeder, the solid ingredient can be quickly transferred with high reliability.

In addition, the number of solid ingredients supplied to the transfer tube from among the plurality of solid ingredients contained in the storage container may be controlled by the control valve, so that the food ingredients can be quantified, and the degradation of the cooking quality, which may occur when the input amount of the ingredients is different during each cooking operation, can be prevented.

Further, during the operation of the feeder, air blown from the feeder may be blocked by the intermediate valve so that the amount of air introduced into the inside of the transfer tube may be minimized, and penetration of foreign substances into the inside of the transfer tube and the storage container can be minimized.

In addition, since the intermediate valve is elastically deformed to open or close the transfer tube, power consumption can be minimized as compared to the case in which a separate motor or solenoid valve is installed to open or close the intermediate valve.

Further, when the feeder is operated in a state in which a plurality of solid ingredients transferred from the transfer tube are accommodated in the feed tube and the variable stopper, the solid ingredients are transferred together, so that the number of operation/stop of the feeder can be minimized and a plurality of solid ingredients can be transferred simultaneously with high reliability.

In addition, since the variable stopper is opened or closed by air blown from the feeder, power consumption can be minimized as compared to the case in which a separate motor or electronic valve is installed to open or close the variable stopper.

The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

The scope of protection of the present invention should be construed according to the following claims, and all technical ideas falling within the equivalent scope to the scope of protection should be construed as falling within the scope of the present invention.

What is claimed is:
1. A robot comprising:
an ingredient mold configured to process food ingredients into solid ingredients;
a storage container configured to store the solid ingredients processed in the ingredient mold;
a transfer tube through which the solid ingredients in the storage container pass;
a feed tube connected to the transfer tube, formed with an ingredient port, and having a passage configured to guide ingredients to the ingredient port;
a feeder configured to feed the solid ingredients, which are moved to the feed tube, to the ingredient port; and
a control valve disposed at an outlet of the storage container or an upper portion of the transfer tube to control a drop of the solid ingredients contained in the storage container,
wherein a plurality of storage containers including the storage container, a plurality of control valves including the control valve, and a plurality of transfer tubes including the transfer tube are provided,
wherein each of the plurality of transfer tubes includes a connection terminal connected to the feed tube, and
wherein the connection terminals of the plurality of transfer tubes are spaced apart from each other in a longitudinal direction of the feed tube.

2. The robot according to claim 1, wherein each control valve includes:
- a valve body rotatably disposed at the outlet of a respective storage container among the plurality of storage containers or in a respective transfer tube among the plurality of transfer tubes; and
- a motor configured to rotate the valve body.

3. The robot according to claim 2, wherein each motor includes:
- a motor rod connected to the valve body to linearly move; and
- a solenoid motor configured to linearly reciprocate the motor rod.

4. The robot according to claim 2, wherein each control valve is configured to be opened or closed for a time during which a plurality of solid ingredients contained in each storage container drop one by one.

5. The robot according to claim 2, further comprising a controller which is configured to:
- count a number of operation times of each control valve; and
- stop an operation of each control valve when the number of operation times is equal to or more than a preset number of operation times.

6. The robot according to claim 1, further comprising an intermediate valve disposed below each transfer tube.

7. The robot according to claim 6, wherein each intermediate valve includes an elastic plug configured to open a transfer passage inside a respective transfer tube among the plurality of transfer tubes while being deformed by the solid ingredients dropped from a respective storage container among the plurality of storage containers.

8. The robot according to claim 1, wherein the feed tube is inclined in a direction gradually lowered toward the ingredient port.

9. The robot according to claim 1, wherein the plurality of storage containers are disposed in parallel to each other, and
wherein the plurality of transfer tubes have lengths which are increased as the transfer tubes are located closer to the ingredient port.

10. The robot according to claim 1, wherein the feeder includes a blower disposed opposite to the ingredient port to provide pneumatic pressure to the passage.

11. The robot according to claim 1, further comprising a variable stopper which is disposed at the passage to prevent the solid ingredients from moving to the ingredient port when an operation of the feeder is stopped, and to allow the solid ingredients to move to the ingredient port when the feeder operates.

12. A robot comprising:
- an ingredient mold configured to process food ingredients into solid ingredients;
- a storage container configured to store the solid ingredients processed in the ingredient mold:
- a transfer tube through which the solid ingredients in the storage container pass;
- a feed tube connected to the transfer tube, formed with an ingredient port, and having a passage configured to guide ingredients to the ingredient port;
- a feeder configured to feed the solid ingredients, which are moved to the feed tube, to the ingredient port;
- a stopper rotatably disposed in the passage; and
- a spring configured to elastically support the stopper to allow the stopper to rotate in a direction of blocking the passage,
wherein the feeder includes a blower configured to blow air having a preset pressure or above to the stopper, and
wherein the preset pressure is a pressure that causes the stopper to rotate in a direction of opening the passage.

13. The robot according to claim 12, further comprising a limiter disposed in the passage and latched when the stopper is in a direction of blocking the passage.

14. The robot according to claim 1, further comprising a robot arm configured to receive the solid ingredients supplied from the ingredient port and formed with an ingredient channel to guide the supplied solid ingredients.

15. A robot comprising:
- a robot arm including an arm to which an end effector is connected, in which the arm and the end effector are formed therein with an ingredient channel through which solid ingredients pass; and
- an ingredient feeder configured to process food ingredients into solid ingredients and to feed the solid ingredients into the ingredient channel,
wherein the ingredient feeder includes:
- an ingredient mold configured to process the food ingredients into the solid ingredients;
- a storage container configured to store the solid ingredients processed in the ingredient mold;
- a transfer tube through which the solid ingredients contained in the storage container pass;
- a feed tube connected to the transfer tube, formed with an ingredient port, and having a passage configured to guide ingredients to the ingredient port; and
- a feeder configured to feed the solid ingredients, which are moved to the feed tube, to the ingredient port,
wherein the robot further comprises a variable stopper,
wherein the variable stopper includes:
- a stopper rotatably disposed in the passage; and
- a spring configured to elastically support the stopper to allow the stopper to rotate in a direction of blocking the passage,
wherein the feeder includes a blower configured to blow air having a preset pressure or above to the stopper, and
wherein the preset pressure is a pressure that causes the stopper to rotate in a direction of opening the passage.

16. The robot according to claim 15, further comprising a control valve disposed at an outlet of the storage container or an upper portion of the transfer tube to control a drop of the solid ingredients contained in the storage container.

17. The robot according to claim 15, further comprising an intermediate valve disposed below the transfer tube.

* * * * *